(12) United States Patent
Hwang et al.

(10) Patent No.: US 8,698,422 B2
(45) Date of Patent: Apr. 15, 2014

(54) AVERAGE CURRENT CONTROLLER

(75) Inventors: Jong Tae Hwang, Seoul (KR); Seong Joon Park, Seoul (KR); Dae Ho Kim, Seoul (KR); Moon Sang Jung, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 371 days.

(21) Appl. No.: 13/206,195

(22) Filed: Aug. 9, 2011

(65) Prior Publication Data

US 2012/0049753 A1    Mar. 1, 2012

(30) Foreign Application Priority Data

Aug. 26, 2010  (KR) .................. 10-2010-0082960

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ......................... 315/307; 315/224

(58) Field of Classification Search
None
See application file for complete search history.

(56) References Cited

U.S. PATENT DOCUMENTS 7,471,268 B2 *  12/2008  Shimoda .................. 345/76

FOREIGN PATENT DOCUMENTS

KR    10-2010-0034712 A    4/2010

* cited by examiner

*Primary Examiner* — Douglas W Owens
*Assistant Examiner* — Dedei K Hammond
(74) *Attorney, Agent, or Firm* — Sherr & Jiang, PLLC (57) ABSTRACT

An average current controller configured for connection to display-components through a power switch. The average current controller includes first, second, and third comparators, an integrator, and a reference current generator. The first comparator compares a peak current level of reference current with a load current level of load current and outputs a first comparison result. The load current denotes current flowing through the display-components. The second comparator compares the peak current level of reference current with an average current level of the load current and outputs a second comparison result. The integrator integrates the second comparison result. The third comparator compares the integral value of the integrator with a predetermined value and outputs a third comparison result. The reference current generator sets the peak current level based on the first comparison result and the third comparison result and generates the reference current with the set peak current level.

19 Claims, 7 Drawing Sheets

FIG. 1

-Related Art-

FIG. 2

-Related Art-

FIG. 3

-Related Art-

FIG. 4

-Related Art-

AVERAGE CURRENT CONTROLLER

The present application claims priority under 35 U.S.C. §119 to Korean Patent Application No. 10-2010-0082960 (filed on Aug. 26, 2010), which is hereby incorporated by reference in its entirety.

BACKGROUND

A linear control scheme and a pulse-width modulation (PWM) scheme have been used for a driver circuit that controls display-components, such as a light emitting diode (LED). In general, the linear control scheme is used for controlling constant current, and the PWM scheme uses power switches for controlling power. Since the PWM scheme can maximize efficiency, the PWM scheme has been preferably used. A buck converter structure has been mainly adapted in the driver circuit because a driving voltage for an LED is mostly higher than a voltage of the LED.

Figure 1:
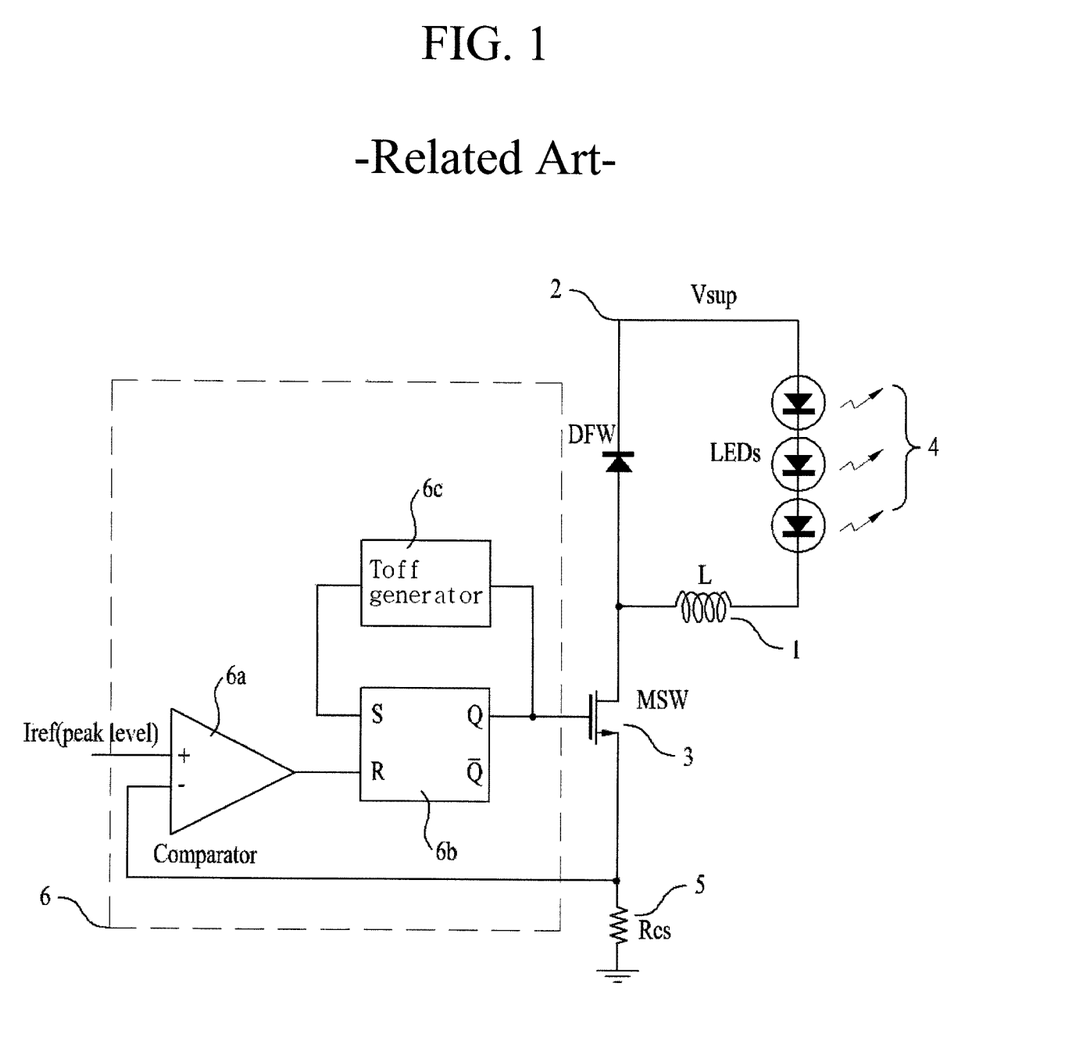
FIG. 1 is a circuit diagram that illustrates a typical driver circuit having a buck converter structure.

FIG. 1 is a circuit diagram that illustrates a driver circuit having a typical buck converter structure. Particularly, FIG. 1 illustrates a constant off-time peak current control type LED driver as a display driver.

As illustrated in FIG. 1, the buck converter structure is a step-down structure. The buck converter structure includes an inductor L 1, a freewheeling diode DFW 2, and a power switch MSW 3. When the power switch 3 is turned on, current flows through LEDs 4 and the LEDs 4 are turned on. When the power switch MSW 3 is turned off, current level is gradually reduced due to load of the LEDs 4 while the current circulates in a closed loop formed of the inductor 1, the freewheeling diode 2, and the LEDs 4.

A resistor Rcs 5 detects a current level of current flowing through the inductor 1 and the LEDs 4 when the power switch 3 is turned on. When the power switch 3 is turned on, a level of current flowing through the inductor 1 increases. The current level of the inductor L is about equal to that of the LEDs 4. When the increment of current level reaches to a predetermined reference current level Iref, the power switch 3 is turned off for a predetermined time Toff.

After a lapse of the predetermined time Toff, the power switch 3 is turned on again. Such switching operation repeats as the power switch 3 is switched on and off.

Figure 2:
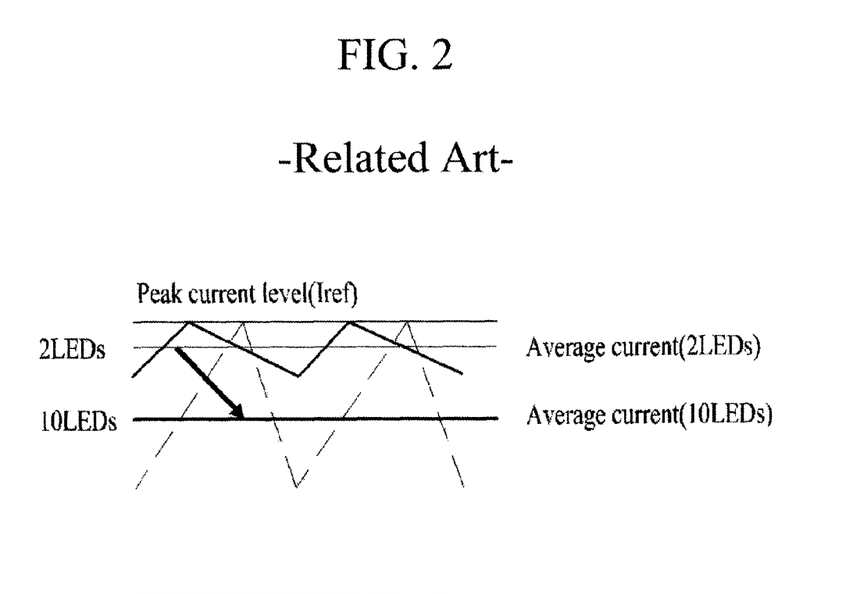
FIG. 2 is a graph that illustrates changes in an average current level with respect to a peak current level according to changes in number of LEDs in the driver circuit of FIG. 1.

As illustrated in FIG. 2, due to the repeated switching operation of the power switch 3, a peak current level is kept constantly. As described herein, the constant current control scheme is relatively simple. Accordingly, the constant current control scheme can provide reliable and secure operation and has no slope-compensation problem which is likely caused in a PWM-type current control converter.

The constant current control scheme, however, has drawbacks as well. For instance, a great gap can occur between an average current level and a peak current level in the constant current control scheme when difference between the peak current level and the minimum current level is great. That is, when the extent of current ripples is comparatively great, as illustrated FIG. 2, there is a large gap between the average current level and the peak current level. In particular, the current ripple problem gets more serious as the number of LEDs increases. As a result, the average current level of current flowing through the LEDs is getting reduced.

FIG. 2 is a graph that illustrates changes in an average current level with respect to a peak current level in accordance with changes in number of LEDs in the driver circuit of FIG. 1.

As illustrated in FIG. 2, an average current level decreases as the number of LEDs increases. In order to prevent the average current level from decreasing, a switching control scheme was introduced. In the switching control scheme, differences between an average current level and a level of current flowing through the inductor L are integrated, and switching operation of the power switch 3 is controlled based on the integral value.

Figure 3:
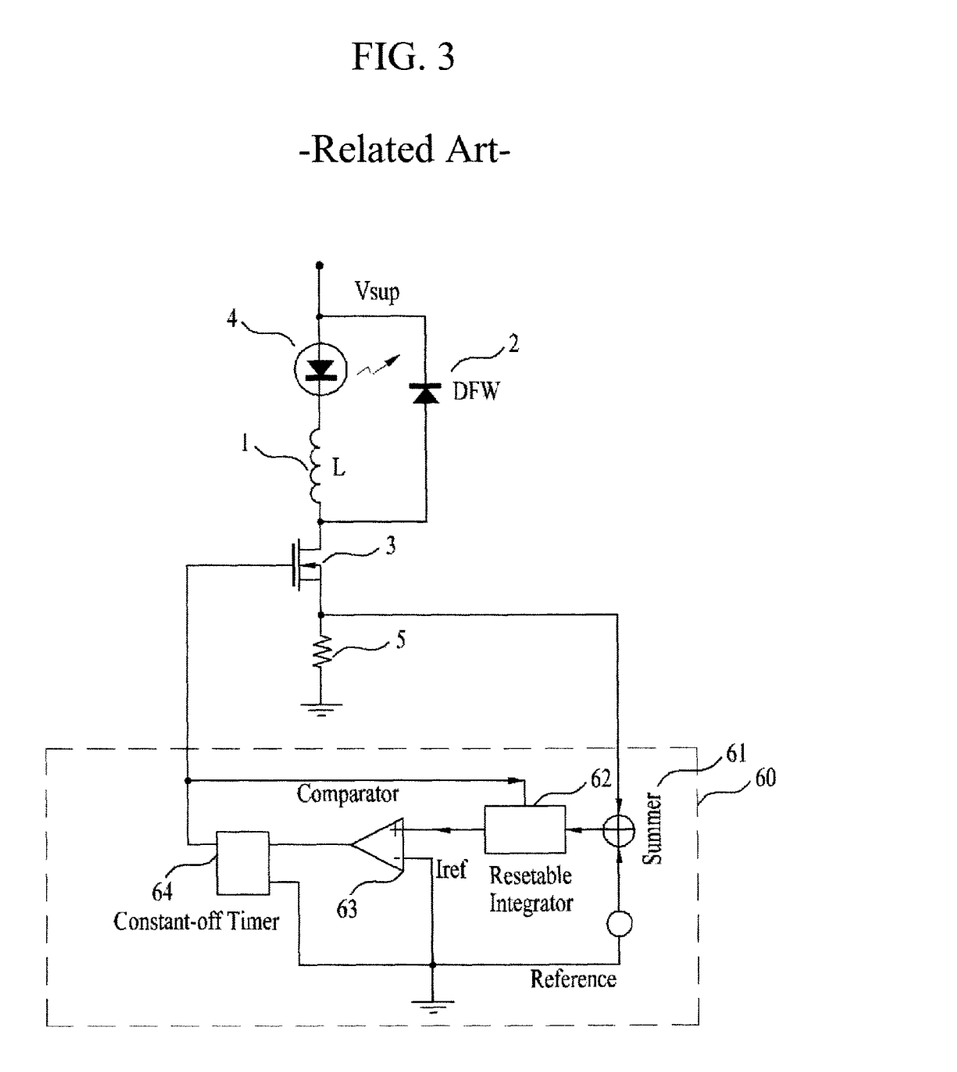
FIG. 3 is a circuit diagram that illustrates a typical driver circuit having another buck converter structure.
Figure 4:
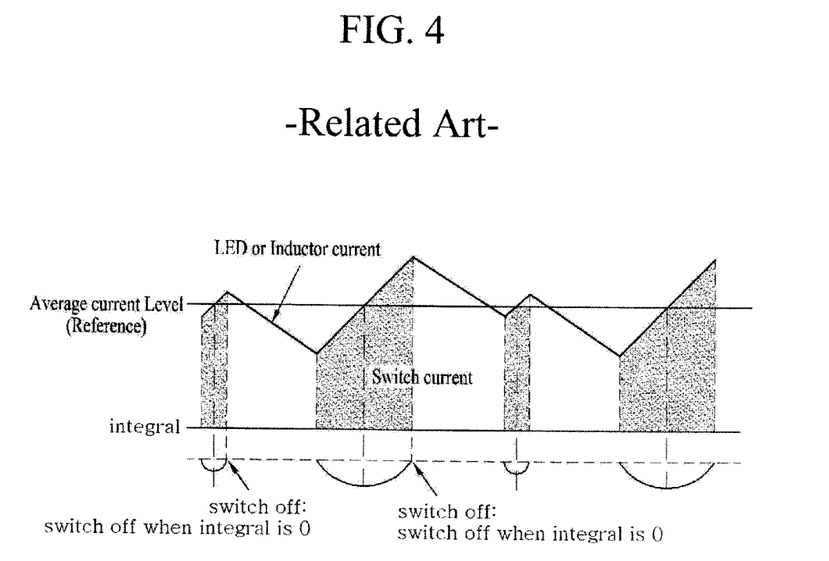
FIG. 4 is a graph for describing a switching control principle and a sub-harmonic problem of a power switch in the driver circuit of FIG. 3.

FIG. 3 is a circuit diagram that illustrates a driver circuit having another buck converter structure. FIG. 4 is a graph for describing a switching control principle and a sub-harmonic problem of a power switch in the driver circuit of FIG. 3. Like reference numerals designate like elements throughout FIGS. 1 through 4.

As illustrated in FIG. 3, the driver circuit includes a constant current switching control circuit 60. The constant current switching circuit 60 includes a resettable integrator 62 for controlling switching operation of a power switch 3.

Hereinafter, the principle for controlling switching operation of the power switch will be described with reference to FIGS. 3 and 4. The resettable integrator 62 integrates differences between a reference current level and a level of current flowing through an inductor L 1. Here, the current level of the inductor 1 is detected by a resistor 5 and the detected current level can be equal to that of current flowing through LED 4. Further, the reference current level corresponds to an average current level. When an integral value of the resettable integrator 62 reaches zero, the power switch 3 is turned off and a timer 64 is activated. Here, the timer 64 determines a switch-off time of the power switch 3. While the timer 64 is activated, the power switch 3 remains in off in order to control the average current level.

As described herein, the driver circuit of FIG. 3 can control the average current level for the LED 4 through simple operation. Furthermore, the driver circuit of FIG. 3 can control a constant current level although the number of LEDs is changed or although a forward voltage of the LEDs 4 is changed along temperature.

The driver circuit of FIG. 3, however, can have a sub-harmonic problem because a current level is controlled based on a switch-off time set in cooperation with the timer 64. For example, the driver circuit predetermines an integration start time for integrating current levels of the inductor. Such a predetermined integration start time is unintentionally changed at a next switch-on time of the power switch 3 due to a previous switch-off time although the power switch 3 is switched off when the integral value of the resettable integrator 62 reaches zero. The unintentional change of the predetermined integration start time can cause the sub-harmonic problem that repeatedly repeats operation of detecting a current level of an inductor L.

Accordingly, there is a need to provide a new constant current control scheme for preventing the sub-harmonic problem and the average current level of current flowing through LEDs from decreasing as the number of LEDs is changed.

SUMMARY

Embodiments relate to a driver circuit for stably controlling constant current regardless of a switch-off time.

Embodiments relate to a driver circuit for stably controlling constant current regardless of changes in number of display-components, such as light emitting diodes (LEDs).

Embodiments relate to a driver circuit for stably controlling an average current level of current flowing through display-components, such as light emitting diodes (LEDs) regardless of change in number of display-components.

Embodiments relate to a driver circuit for minimizing a sub-harmonic problem.

In accordance with embodiments, an average current controller is connected to display-components through a power switch. The average current controller includes first, second and third comparators, an integrator, and a reference current generator. The first comparator is configured to compare a peak current level of reference current with a load current level of load current and output a first comparison result. The load current denotes current flowing through the display-components. The second comparator is configured to compare the peak current level of reference current with an average current level of the load current and output a second comparison result. The integrator is configured to integrate the second comparison result. The third comparator is configured to compare the integral value of the integrator with a predetermined value and output a third comparison result. The reference current generator is configured to set the peak current level based on the first comparison result and the third comparison result and generate the reference current with the set peak current level.

The reference current generator can generate initial reference current having the average current level of the load current. The reference current generator can set a plurality of peak current levels, select one of the plurality of peak current levels based on the first comparison result and the third comparison result, and output the reference current with the selected peak current level. The reference current generator can change the peak current level of reference current when the first comparison result indicates the load current level reaches the peak current level. The reference current generator can increase the peak current level by a predetermined increment value when the third comparison result is a high-level signal at a rising edge of the first comparison result. The reference current generator can decrease the peak current level by a predetermined decrement value when the third comparator result is a low-level signal at a rising edge of the first comparison result.

The first comparator can output a reset signal to turn off the power switch when the load current level is equal to the peak current level, and the reset signal can be used to control the peak current level together with the second comparison result. The second comparator can output a high-level signal when the load current level is equal to or lower than the average current level and output a low-level signal when the detected current level is higher than the average current level.

The constant current integrator can integrate the second comparison result to have a positive slope when the second comparison result is a high-level signal. The constant current integrator can also integrate the second comparison result to have a negative slope when the second comparison result is a low-level signal. Such a constant current integrator can be initialized to a predetermined value when the constant current integrator receives a reset signal.

The reference current generator can increase the peak current level by a predetermined increment value when the constant current integrator outputs an integral value with the positive slope at a rising edge of the first comparison result of the first comparator. Further, the reference current generator can decrease a peak current level by a predetermined decrement value when the constant current integrator outputs an integral value with the negative slope.

The third comparator can output a high-level signal when the integral value is greater than the predetermined value and output a low-level signal when the integral value is smaller than the predetermined value.

In accordance with embodiments, a driver circuit is configured to control display-components, and can include at least the following: a resistor configured to detect a current level of current flowing through the display-components, an average current controller configured to set a peak current level of reference current based on difference between an average current level and the detected current level, compare the detected current level with the controlled peak current level, and output a drive signal based on the comparison results, and a power switch configured to be turned on and off to supply or interrupt current to the display-components in response to the drive signal output from the average current controller.

The power switch can be turned off when the drive signal of the average current controller is a high-level signal. Then, the power switch can be turned on again after a lapse of a switch-off time.

The average current controller can set a plurality of peak current levels, selects one of the peak current levels based on the difference between the average current level and the detected current level, and compare the detected current level with the selected peak current level to output the drive signal. The average current controller can calculate differences between the average current level and the detected current level until the detected current level reaches a peak current level, integrate the calculated differences, and use the integral value to select one from the plurality of peak current level. The average current controller can change the peak current level based on an integral value of the difference between the average current level and the detected current level.

The average current generator can also increase the peak current level and output the reference current with the increased peak current level when a first integral value is greater than a second integral value. Further, the average current generator can decrease the peak current level and output the reference current with the decreased peak current level when the first integral value is smaller than the second integral value. The average current controller can calculate the first integral value by integrating differences between the detected current level and the average current level until the detected current level reaches the average current level. The average current controller can calculate the second integral value by integrating differences between the average current level and a peak current level until the average current level reaches the peak current level.

The average current level can be a predetermined fixed value, and an initial peak current level can be equal to the average current level. The average current controller can change the peak current level of reference current based on difference between the detected current level and the peak current level and difference between a first time taken until the detected current level reaches the average current level and a second time taken until the detected current level reaches the peak current level from the average current level. The average current controller can increase the peak current level when the first time is longer than the second time.

DRAWINGS

Example

Example

Example

DESCRIPTION

An average current controller in accordance with embodiments will be described with reference to the accompanying drawings. In accordance with embodiments, the average current controller employs a dynamic average control scheme for dynamically controlling a peak current level.

Figure 5:
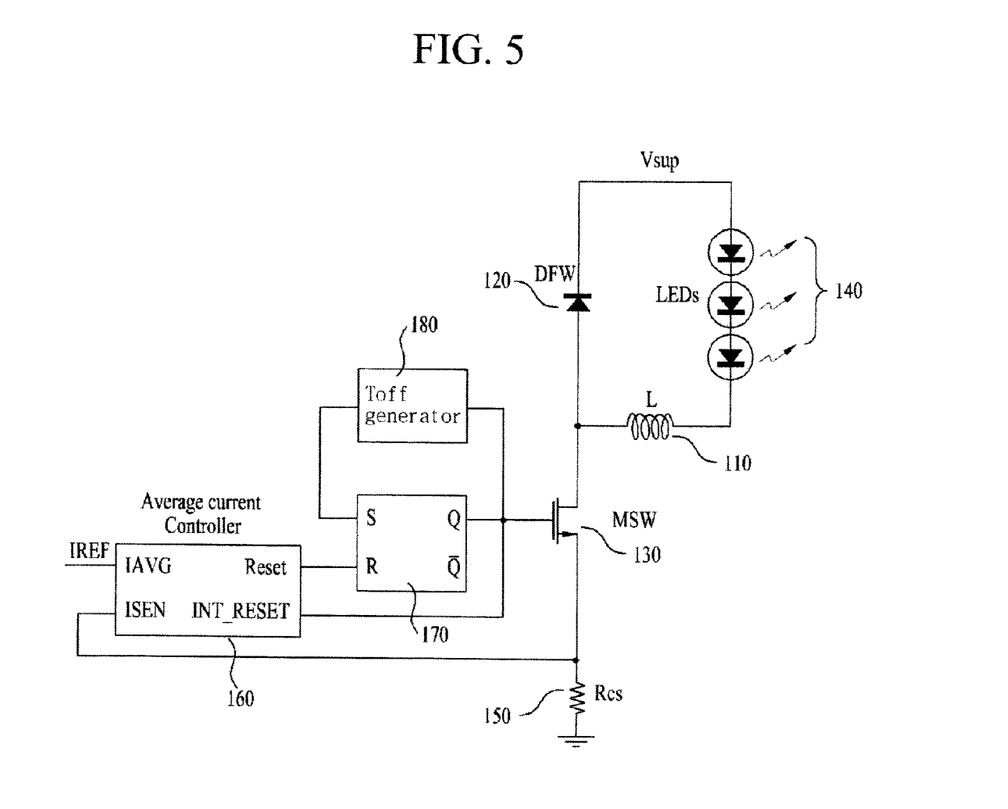
FIG. 5 is a circuit diagram that illustrates a driver circuit including an average current controller in accordance with embodiments.

Example FIG. 5 is a circuit diagram that illustrates a driver circuit including an average current controller in accordance with embodiments. Example FIG. 6. is a circuit diagram that illustrates an average current controller in accordance with embodiments. Particularly, the circuit diagram of example FIG. 5 illustrates a peak current control type LED driver. The average current controller in accordance with embodiments can be included in a driver circuit for driving display-components, such as light emitting diodes (LEDs) and support current control for the display-components.

As illustrated in example FIG. 5, the driver circuit in accordance with embodiments can include an average current controller 160, a switch-off time generator 180, a flip-flop 170, a resistor Rcs 150, a power switch MSW 130, an inductor L 110, a freewheeling diode DFW 120, and a plurality of light emitting diodes (LEDs) 140.

The resistor 150 can detect a current level of current flowing through the inductor 110. The detected current level can be equal to a current level of current flowing through the LEDs 140. The average current controller 160 can compare the detected current level with an average current level IAVG. Based on the comparison result, the average current controller 160 can output a drive signal through a Reset terminal to control the power switch 130. For example, when the average current controller 160 outputs a high-level signal through the Reset terminal, the power switch 130 can be turned off. The power switch 130 can be turned on again after a lapse of a switch-off time Toff.

When the power switch 130 is turned on, current flowing through the LEDs 140 increases. On the other hand, when the power switch 130 is turned off, the current flowing through the LEDs 140 decreases due to load of the LEDs 4 while the current circulates in a closed loop formed of the inductor 110, the freewheeling diode 120, and the LEDs 140.

The resistor 150 can detect the current level of the LEDs 140 which is equal to the current level of the inductor 110 when the power switch 130 is turned on. The resistor 150 is connected to the average current controller 160, and the detected current level of the inductor 110 is input to the average current controller 160. That is, the current level of current flowing through the LEDs 140 is input to the average current controller 160. Due to the repeated switching operation of the power switch 130, the peak current level is controlled to a predetermined current level after repeatedly decreasing or increasing.

The LEDs 140 can correspond to load. Accordingly, a current level of current flowing through the inductor 110 or the LEDs 140 will be referred to as a load current level hereinafter. Further, current flowing through the load is defined as load current. When the power switch 130 is on, current flowing through the inductor 110 will become equal to that flowing through the load. Accordingly, a current level detected by the resistor 150 can be a load current level.

Hereinafter, the average current controller 160 in accordance with embodiments will be described in detail with reference to example FIG. 6. The average current controller 160 can generate a drive signal based on a peak current level of reference current and a current level detected by the resistor 150 and output the drive signal to the flip-flop 170 for generating a switch-off time Toff.

The average current controller 160 can set a plurality of peak current levels and select one of the peak current levels for the load current. In order to set the peak current level, the average current controller 160 can uses a predetermined value calculated based on an average current level and a load current level. For example, the average current controller 160 can obtain differences between the average current level and the load current level until the load current level reaches a predetermined peak current level. Then, the average current controller 160 can integrate the obtained differences and use the integral value to set the peak current level. In more detail, the average current controller 160 can calculate a first integral value by integrating differences between a load current level and an average current level until a load current level reaches an average current level. The average current controller 160 can also calculate a second integral value by integrating differences between an average current level and a peak current level until the average current level reaches a peak current level. When the first integral value is greater than the second integral value, the average current generator 160 can increase a reference current level to be set as a peak current level. When the first integral value is smaller than the second integral value, the average current generator 160 can decrease a reference current level to be set as a peak current level. Here, the peak current level is referred to as a peak current level IPEAK.

Figure 6:
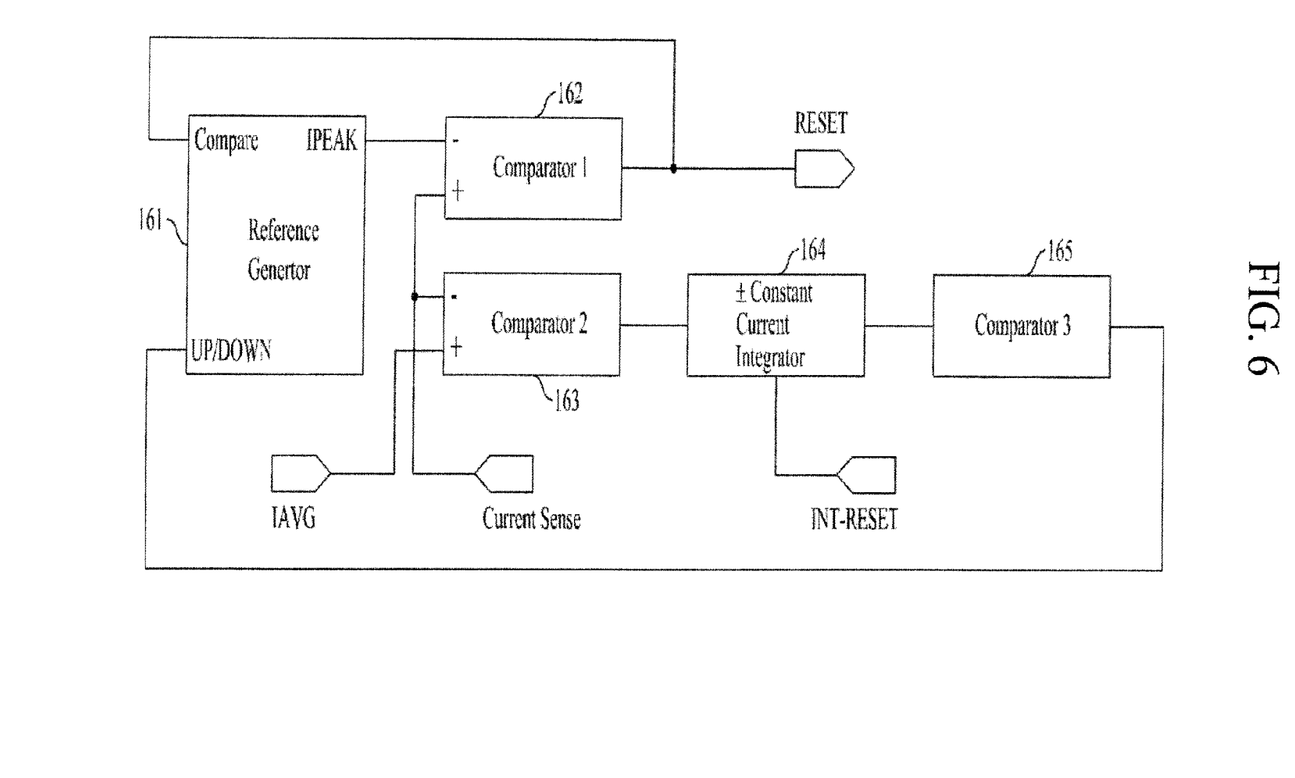
FIG. 6 is a block diagram that illustrates an average current controller in a display driver in accordance with embodiments.

As illustrated in example FIG. 6, the average current controller 160 in accordance with embodiments can include a reference current generator 161, a first comparator 162, a second comparator 163, a constant current integrator 164, and a third comparator 165. The reference current generator 161 can generate reference current corresponding to a peak current level IPEAK. Accordingly, the reference current generator 160 can correspond to a peak current generator. A comparison result output from the first comparator 162 will be referred to as a first comparison result. A comparison result output from the second comparator 163 will be referred to as a second comparison result, and a comparison result output from the third comparator 165 will be referred to as a third comparison result.

The reference current generator 161 can output the reference current to the first comparator 162. The generated reference current can be compared with load current by the first comparator 162. Particularly, the reference current output from the reference current generator 161 can have a peak current level IPEAK, rather than an average current level of the load current.

The reference current generator 161 can have two input terminals, a Compare terminal and a UP/DOWN terminal. For example, the reference current generator 161 receives a first comparison result from the first comparator 162 through the Compare terminal and a third comparison result from the third comparator 165 through the UP/DOWN terminal.

The reference current generator 161 can generate initial reference current having an average current level IAVG of load current. The reference current generator 161 can receive a first comparison result from the first comparator 162 through the Compare terminal and receive a third comparison result from the third comparator 165 through the UP/DOWN terminal. Here, the first and third comparison results can be a pulse signal. Based on the received first and third comparison results from the first and third comparators 162 and 165, the reference current generator 161 changes a peak current level IPEAK of the reference current and outputs reference current with the changed peak current level IPEAK. For example, the reference current generator 161 increases the peak current level IPEAK by a predetermined increment value and outputs reference current with the increased peak current level when the pulse signal output from the third comparator 165 is a high-level signal at a rising edge of the pulse signal output from the first comparator 162. On the other hand, the reference current generator 161 decreases the peak current level IPEAK by a predetermined decrement value and outputs reference current with the decreased peak current level when the output pulse of the third comparator 165 is a low-level signal at a rising edge of the output pulse of the first comparator 162. The predetermined increment value and the predetermined decrement value of the peak current level (IPEAK) can be decided according to the characteristics of the circuit.

Such operation of the reference current generator 161 can be represented as follows in a hardware description language (HDL) such as Verilog, which is used in system design for semiconductor devices or other electronic fields.

--- emEAK = IAVG;
always @(posedge compare)
If (UP/DOWN = high)
IPEAK = IPEAK + Delta;
else
IPEAK = IPEAK − Delta;

---

As described herein, the reference current generator 161 can change the peak current level IPEAK according to the output state of the third comparator 165 based on the output of the first comparator 162. Namely, the reference current generator 161 changes a peak current level based on the first comparison result and the third comparison result. Accordingly, the reference current generator 161 can select one of peak current levels based on the first and third comparison results and output the selected peak current level.

The first comparator 162 can include two input terminals. When the power switch 130 is on, the first comparator 162 can receive reference current having a controlled peak current level from the reference current generator 161 through one input terminal. The first comparator 162 can also receive a current level ISENSE detected by the resistor 150 which is connected to an output terminal, such as a source, of the power switch 130. Here, the detected current level is a current level of load current. The first comparator 162 can compare the two inputs and output the first comparison result. For example, the first comparator 162 can generate and output a reset signal RESET when the detected current level ISENSE becomes equal to the peak current level IPEAK output from the reference current generator 161.

When the first comparator 162 outputs the reset signal RESET, the power switch 130 can be turned off. That is, the reset signal RESET output from the first comparator 162 is a drive signal for a switch-off time Toff. The reset signal RESET is input to the flip-flop 170. The flip-flop 170 turns off the power switch 130 for the switch-off time Toff in cooperation with the switch-off time generator 180. The reset signal RESET can be input to the reference current generator 161 and used to decide a peak current level IPEAK together with the second comparison result of the second comparator 165.

The second comparator 163 can receive an average current level IAVG and a current level ISENSE detected by the resistor 50 when the power switch 140 is on. Here, the current level ISENSE is a current level of load current. Then, the second comparator 163 can compare the two inputs and outputs a second comparison result. That is, the second comparator 163 can output a high-level signal when the detected current level ISENSE is equal to or lower than the average current level IAVG. On the other hand, the second comparator 163 can output a low-level signal when the current level ISENSE is higher than the average current level IAVG. The average current level IAVG input to the second comparator 163 can be equal to a peak current level IPEAK of initial current reference output from the reference current generator 161.

The constant current integrator 164 can integrate the second comparison result to have a positive slope or a negative slope. That is, the constant current integrator 164 integrates current levels to have a predetermined positive slope when the second comparison result of the second comparator 163 is a high-level signal. On the contrary, the constant current integrator 164 can integrate current levels to have a predetermined negative slope when the output of the second comparator 163 is a low-level signal. As a result, the reference current generator 161 can increase a peak current level and output reference current with the increased peak current level when the constant current integrator 164 outputs an integral value of the second comparison results with the positive slope at a rising edge of the output pulse of the first comparator 162. On the contrary, the reference current generator 161 can decrease a peak current level and output reference current with the decreased peak current level when the constant current integrator 164 output an integral value of the second comparison result with the negative slope.

When a reset signal INT_RESET is input to the constant current integrator 164, the constant current integrator 164 can initialize the integral value to "0." When a Q port of the flip-flop 170 outputs a low-level signal in example FIG. 5, an initial reset signal INT_RESET can input to the constant current integrator 164 and the constant current integrator 164 can be initialized.

The third comparator 165 can determine whether or not the integral value of the constant current integrator 164 is greater than 0. For example, the third comparator 165 can output a high-level signal when the integral value is greater than 0. The third comparator 165 can output a low-level signal when the integral value is equal to or less than 0.

Figure 7:
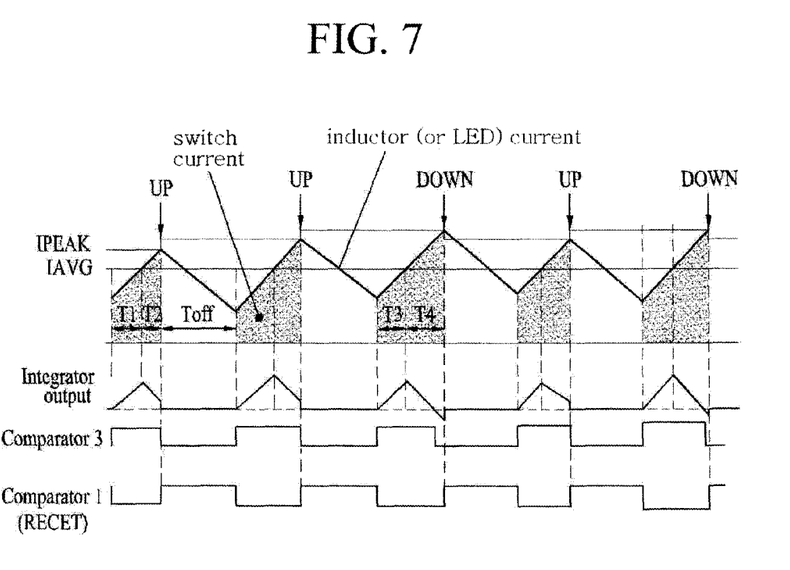
FIG. 7 is a timing diagram for describing operation of the driver circuit and the average current controller illustrated in example FIGS. 5 and 6.

Hereinafter, operation of the driver circuit and the average current controller in accordance with embodiment will be described with reference to example FIG. 7. Example FIG. 7 is a timing diagram for describing operation of the display driver and the average current controller illustrated in example FIGS. 5 and 6.

In time domain, the average current controller 160 in accordance with embodiments can change a peak current level based on difference between a first time until load current reaches average current and a second time until the load current reaches reference current having a peak current level from the average current while using comparison of a load current level and a peak current level. The average current controller 160 can increase a peak current level when the first time is longer than the second time. Also, the average current controller 160 can decrease a peak current level when the second time is longer than the first time. Such operation will be described in more detail hereinafter.

When the power switch 130 is turned on, a load current level can increase. Here the load current level can be a current level ISENSE detected at the resistor 150. Before the first comparator 162 outputs the RESET signal, the current level ISENSE increases until it reaches to the peak current level IPEAK. When the detected current level ISENSE is lower than the average current level IAVG, the second comparator 163 can output a high-level signal. Accordingly, the output of the constant current integrator 164 increases from 0 with a predetermined slope for a first time T1.

On the other hand, when the detected current level ISENSE is higher than the average current level IAVG after the lapse of the first time T1, the second comparator 163 can output a low-level signal. Accordingly, the output of the constant current integrator 164 can decrease with a predetermined slope.

When the constant current integrator 164 integrates current levels to have a positive slope or a negative slope, the first comparator 162 outputs a positive integral value because a second time T2 is shorter than the first time T1 based on the average current level IAVG as illustrated in example FIG. 7. That is, when the first comparator 162 outputs a high-level signal, the third comparator 165 outputs a high-level signal. Accordingly, the reference current generator 160 can increase a peak current level IPEAK by one predetermined step, such as one delta value, and output reference current with the increased peak current level IPEAK.

On the other hand, if a fourth time T4 is longer than a third time T3 based on the average current level IAVG as shown in example FIG. 7, the third comparator 165 can output a low-level signal when the first comparator 162 can output a high-level signal. Accordingly, the reference current generator 161 can decrease the peak current level IPEAK by one predetermined step, such as one delta value, and output reference current with the decreased peak current level.

As described herein, the average current controller 160 can repeatedly increase and decrease the peak current level IPEAK by a predetermined increment step or a predetermined decrement step. Meanwhile, the reference current generator 161 can decrease current flowing through load for a predetermined time when the reference current generator 161 generates and outputs reference current with an increased peak current level or with a decreased peak current level. Such operation of decreasing load current can be performed when the load current reaches reference current having a peak current level. As the power switch 130 is turned off, current decreases by load while current circulates a closed loop.

The operation of decreasing load current can be performed by interrupting current supply to load for a predetermined time. That is, the first comparator 162 generates and output a reset signal RESET when the load current reaches the reference current having a peak current level from the reference current generator 161. Such a reset signal RESET can cause the operation of decreasing the load current. When the reset signal RESET of the first comparator 162 causes decreasing the load current, a peak current level IPEAK decreases or increases. Here, the predetermined increment level or the predetermined decrement level of the peak current level IPEAK is set to be very small. Accordingly, the average current level of load current can become about a steady level.

An ideal condition for keeping the average current level of the load current steadily is when the first time T1 meats the second time T2. Here, the first time T1 denotes a time taken for a minimum current level reaches to the average current level IAVG, and the second time T2 denotes a time taken for the average current level IAVG reaches to the peak current level IPEAK.

Slight ripples, however, can occur since the peak current level IPEAK is repeatedly increased or decreased. In accordance with embodiments, the average current level of load current is kept nearly constant since the increment and/or decrement level of the peak current level IPEAK is set to be very small and the maximum increment level or the minimum decrement level of the peak current level IPEAK is also set to be very small.

As described herein, the peak current level is controlled to obtain a constant average current level of the load in accordance with embodiments. Further, the sub-harmonic problem can be prevented because the increment level and/or the decrement level of the peak current level are set to be sufficiently small.

As described herein, the driver circuit having the average current controller in accordance with embodiments can stably control an average current level of current flowing loads by performing constant current control for loads. Meanwhile, the average current level can be a predetermined fixed level or an average level of load current. In the embodiments, a plurality of peak current levels can be stored in a memory. Accordingly, the average current controller in accordance with embodiments can select one of the plurality of peak current levels and generate reference current with the selected peak current level.

The average current generator in accordance with embodiments can enable constant current control in the driver circuit. Furthermore, the average current generator can effectively prevent a sub-harmonic problem which is caused by a previous switching-off time by controlling a peak current value. Moreover, the average current generator can prevent average current flowing through load such as display-components although the extent of ripples can be great because the number of loads is changed. In conclusion, the average current generator in accordance with embodiments can realize stable content current control by controlling and changing a peak current level.

Although embodiments have been described herein, it should be understood that numerous other modifications and embodiments can be devised by those skilled in the art that will fall within the spirit and scope of the principles of this disclosure. More particularly, various variations and modifications are possible in the components parts and/or arrangements of the subject combination arrangement within the scope of the disclosure, the drawings and appended claims. In addition to variations and modifications in the component parts and/or arrangements, alternative uses will also be apparent to those skilled in the art.

What is claimed is:

1. An average current controller connected to display-components through a power switch, the average current controller comprising:
a reference current generator configured to set a plurality of peak current levels based on a first comparison result of a peak current level of a reference current with a load current level of load current denoting current flowing through the display-components, and a second comparison result of an integral value of the peak current level of the reference current and an average current level of the load current with a predetermined value, select one of the plurality of peak current levels based on the first comparison result and the second comparison result, and output a reference current with the selected peak current level.

2. The average current controller of claim 1, wherein the reference current generator is configured to generate an initial reference current having the average current level of a load current.

3. The average current controller of claim 2, wherein the reference current generator is configured to change the peak current level of reference current when the first comparison result indicates the load current level reaches the peak current level.

4. The average current controller of claim 1, wherein the reference current generator:
increases the peak current level by a predetermined increment value when the second comparison result is a high-level signal at a rising edge of the first comparison result, and
decreases the peak current level by a predetermined decrement value when the second comparator result is a low-level signal at a rising edge of the first comparison result.

5. An average current controller connected to display-components through a power switch, the average current controller comprising:
a first comparator configured to compare a peak current level of reference current with a load current level of load current which denotes current flowing through the display-components, and output a first comparison result;
a second comparator configured to compare the peak current level of reference current with an average current level of the load current and output a second comparison result;
a constant current integrator configured to integrate the second comparison result;
a third comparator configured to compare the constant current integrator value of the integrator with a predetermined value and output a third comparison result; and
a reference current generator configured to set the peak current level based on the first comparison result and the third comparison result and generate the reference current with the set peak current level.

6. The average current controller of claim 5, wherein:
the first comparator outputs a reset signal to turn off the power switch when the load current level is equal to the peak current level, and
the reset signal is used to control the peak current level together with the second comparison result.

7. The average current controller of claim 5, wherein the second comparator outputs:
a high-level signal when the load current level is equal to or lower than the average current level, and
a low-level signal when the detected current level is higher than the average current level.

8. The average current controller of claim 5, wherein the constant current integrator:
integrates the second comparison result to have a positive slope when the second comparison result is a high-level signal,
integrates the second comparison result to have a negative slope when the second comparison result is a low-level signal, and
is initialized to a predetermined value when the constant current integrator receives a reset signal.

9. The average current controller of claim 8, wherein the reference current generator:
increases the peak current level by a predetermined increment value when the constant current integrator outputs an integral value with the positive slope at a rising edge of the first comparison result of the first comparator, and
decreases a peak current level by a predetermined decrement value when the constant current integrator outputs an integral value with the negative slope.

10. The average current controller of claim 5, wherein the third comparator outputs:
a high-level signal when the integral value is greater than the predetermined value, and
a low-level signal when the integral value is smaller than the predetermined value.

11. A driver circuit for controlling display-components, the driver circuit comprising:
a resistor configured to detect a current level of current flowing through the display-components;
an average current controller configured to set a peak current level of reference current based on a difference between an average current level and the detected current level, compare the detected current level with the controlled peak current level, and output a drive signal based on the comparison results; and
a power switch configured to be turned on and off to supply and interrupt current to the display-components in response to the drive signal output from the average current controller, wherein:
the power switch is turned off when the drive signal of the average current controller is a high-level signal, and
the power switch is turned on again after a lapse of a switch-off time.

12. The driver circuit of claim 11, wherein the average current controller:
sets a plurality of peak current levels,
selects one of the peak current levels based on the difference between the average current level and the detected current level, and
compares the detected current level with the selected peak current level to output the drive signal.

13. The driver circuit of claim 11, wherein the average current controller:
calculates differences between the average current level and the detected current level until the detected current level reaches a peak current level,
integrates the calculated differences, and
uses the integral value to select one from a plurality of peak current levels.

14. The driver circuit of claim 11, wherein the average current controller changes the peak current level based on an integral value of the difference between the average current level and the detected current level.

15. The driver circuit of claim 14, wherein the average current controller:
increases the peak current level and outputs the reference current with the increased peak current level when a first integral value is greater than a second integral value, and
decreases the peak current levels and outputs the reference current with the decreased peak current level when the first integral value is smaller than the second integral value.

16. The driver circuit of claim 15, wherein the average current controller calculates:
the first integral value by integrating differences between the detected current level and the average current level until the detected current level reaches the average current level, and the second integral value by integrating differences between the average current level and a peak current level until the average current level reaches the peak current level.

17. The driver circuit of claim 11, wherein:

the average current level is a predetermined fixed value, and an initial peak current level is equal to the average current level.

18. The driver circuit of claim 11, wherein the average current controller changes the peak current level of reference current based on:

differences between the detected current level and the peak current level, and differences between a first time taken until the detected current level reaches the average current level and a second time taken until the detected current level reaches the peak current level from the average current level.

19. The driver circuit of claim 18, wherein the average current controller increases the peak current level when the first time is longer than the second time.

* * * * *